United States Patent
Beutler

(10) Patent No.: US 11,654,982 B2
(45) Date of Patent: May 23, 2023

(54) CHAIN DRIVE

(71) Applicant: Jörg Beutler, Holzkirchen (DE)

(72) Inventor: Jörg Beutler, Holzkirchen (DE)

( * ) Notice: Subject to any disclaimer, the term of this patent is extended or adjusted under 35 U.S.C. 154(b) by 985 days.

(21) Appl. No.: 16/388,618

(22) Filed: Apr. 18, 2019

(65) Prior Publication Data

US 2020/0001936 A1 Jan. 2, 2020

(30) Foreign Application Priority Data

Jun. 28, 2018 (EP) ..................................... 18180594

(51) Int. Cl.
| | |
|---|---|
| *B62D 55/125* | (2006.01) |
| *B62D 55/065* | (2006.01) |
| *B62D 55/20* | (2006.01) |

(52) U.S. Cl.
CPC ....... *B62D 55/125* (2013.01); *B62D 55/0655* (2013.01); *B62D 55/20* (2013.01)

(58) Field of Classification Search
CPC .. B62D 55/125; B62D 55/20; B62D 55/0655; F16H 7/06; F16H 7/10; F16H 7/18
See application file for complete search history.

(56) References Cited

U.S. PATENT DOCUMENTS

| | | | |
|---|---|---|---|
| 2,416,679 A | 3/1947 | Curtis | |
| 3,459,459 A | 8/1969 | Eilers | |
| 4,472,164 A * | 9/1984 | Pusch | ..................... F16H 55/30 |
| | | | 74/DIG. 10 |
| 7,036,894 B1 | 5/2006 | Woodall et al. | |
| 2010/0133020 A1* | 6/2010 | Matsui | ................. B62D 55/125 |
| | | | 180/9.64 |
| 2012/0304884 A1* | 12/2012 | Urich | ........................ B61B 5/02 |
| | | | 104/165 |

FOREIGN PATENT DOCUMENTS

| | | |
|---|---|---|
| CA | 2455074 A1 | 7/2005 |
| EP | 2483121 A1 | 8/2012 |

* cited by examiner

*Primary Examiner* — Kevin Hurley
*Assistant Examiner* — Marlon A Arce
(74) *Attorney, Agent, or Firm* — Kolitch Romano Dascenzo Gates LLC

(57) ABSTRACT

Drive systems of the present disclosure include a drive member and a stationary counter-toothing arranged along a transport path. The drive member has an endless chain for mutual engagement with the counter-toothing to transmit a driving force, and at least one drive pinion for mutual engagement with the chain and for driving the chain. Guide components are provided at the chain. The drive system may further include a guide element for guiding the guide components of the chain.

17 Claims, 6 Drawing Sheets

CHAIN DRIVE

INTRODUCTION

Transport vehicles with positive drives are well known, for example as rack-and-pinion railways or in mining. Positive-locking drives have the advantage over friction-locking drives that the efficiency can be improved, since sliding of the drive wheel on the drive rail is practically impossible when having a positive-locking connection. In addition, larger torques and thus larger accelerations can be transferred from the drive to the rail. These drives are also in use on amusement rides such as roller coasters.

As a rule, positive-locking drives have a toothed pinion attached to a vehicle and driven by a motor attached to the vehicle which meshes with the teeth of a rack or toothed chain arranged along the travel path (e.g. on a rail). However, the problem arises that a suitable transmission from the motor to the counter-toothing cannot be facilitated and the power transmission may be limited by the number of teeth of the drive pinion meshing the counter-toothing. This problem could be solved by increasing the diameter of the pinion. However, this significantly increases the required installation space and leads to an increase in the required torque provided by the motor, i.e., the gear requirements increase.

Another possibility to solve the problem would be to double the drive train, i.e., to use two or more pinions instead of one pinion, thereby increasing the power transmission. However, this would inevitably lead to higher costs and to more complex control requirements for the motors.

European patent EP2483121B1 shows a well-known positive-locking drive.

SUMMARY

The present disclosure provides systems, apparatuses, and methods relating to chain drive systems. In some embodiments, a drive system may include: a drive member; and a counter-toothing, the drive member comprising: an endless chain for mutual engagement with the counter-toothing in order to transmit a driving force; and at least one drive pinion for mutual engagement with the chain and for driving the chain.

Features, functions, and advantages may be achieved independently in various embodiments of the present disclosure, or may be combined in yet other embodiments, further details of which can be seen with reference to the following description and drawings.

DETAILED DESCRIPTION

Figure 1:
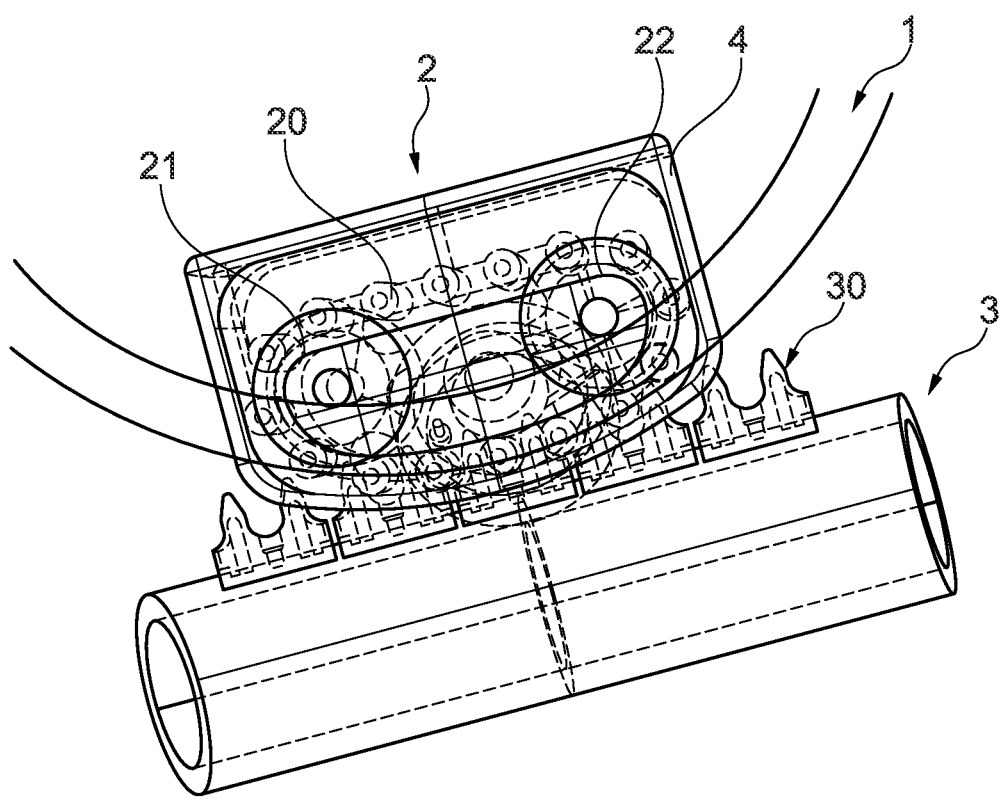
FIG. 1 is a schematic illustration of a drive system according to aspects of the present disclosure.

Various aspects and examples of improved chain drive systems, as well as related methods, are described below and illustrated in the associated drawings. Unless otherwise specified, a chain drive system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; and (4) Conclusion. The Examples, Components, and Alternatives section is further divided into subsections A and B, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

Overview

In general, drive systems of the present disclosure are configured to transmit a large drive torque while requiring little installation space. Such drive systems may include a drive element or drive unit and a counter-toothing, wherein the drive element and drive unit, respectively, comprise an endless chain for mutual engagement with the counter-toothing in order to transmit a driving force and at least one drive pinion for mutual engagement with the chain and for driving the chain. At the chain, guide components are disposed; and the drive system and drive unit, respectively, comprise a guide element for guiding the guide components of the chain at least in the region of engagement with the counter-toothing. The guide element is arranged such that during movement of the chain the guide components located in the region of the guide element are guided by the guide element.

With this drive system, a larger effective pitch circle can be simulated, which simultaneously meshes with several holders or teeth of the counter-toothing. For example, by positively guiding the drive pins of the chain via the guide components, e.g. in a groove, a pitch circle with a large pitch circle diameter (e.g. 800 mm with otherwise typical geometric dimensions) can be generated, which leads to an increased overlap (e.g., 5 teeth).

In the presently disclosed drive systems, the guide element (e.g. a guide rail) may have the shape of a circular section with the radius of a pitch circle of any size. Thus, the pins of the chain are guided along this large pitch circle in the toothed rack at the travel track (e.g. a tube or rail), whereby several pins can be in tooth engagement at the same time. Accordingly, a superposition of several tooth meshes is used. This allows a higher force/torque to be transmitted, while at the same time reducing the installation space compared to the use of a pinion for direct force transmission to the counter-toothing. The driving force can thus be transferred to several pins, so that the individual pin is correspondingly less stressed. The gear ratio can be integrated in the drive element or drive system.

The advantage of this chain drive is in particular that a higher drive force can be transmitted with a much smaller space requirement than via known solutions with one drive wheel.

The drive pins are particularly connected to each other as a chain via plates. The term "chain," however, should be broadly defined to include any endless flexible meshing element that can engage in a counter-toothing section comparable to a chain.

In some examples, two sprockets may be provided to drive the chain. The two sprockets may drive the chain simultaneously and thus share the required power or torque. The result is a high force absorption due to the superposition of many holders in a compact design. The motors may be flanged to a housing of the compact drive element. The system provides a drive train with preferably two motors. However, it is also possible to have one motor or more than two motors or drive pinions integrated in the system.

In the presently disclosed drive system, pins (preferably all or part of the pins) of an ordinary chain may be positively guided by way of guide components, thus increasing the effective pitch circle meshing with the counter-toothing.

In some examples, the counter-toothing is arranged stationary along a transport section, e.g., on a guide rail of the transport section.

In a particular embodiment of the invention, the drive system may be designed in such a way that the counter-toothing may be moved, e.g. along a (stationary) guide section, while the drive element is stationary. The drive system acts as a linear drive, which is similar to a spindle drive or electric cylinder, and which can apply high forces to the counter-toothing/gear rack.

The guide element may have a guide groove and/or a guide surface for engagement of the guide components. The chain is guided at least in the area of a pitch circle along which the chain is to engage with the counter-toothing.

The guide components may preferably have bolts. The guide components may, for example, be constructed in the form of extensions of the pins of the drive chain. The guide components may preferably include rolling bearings and/or sliding bushings. For example, rolling bearings may run in a guide groove of the guide element to keep friction (rolling friction) as low as possible.

The guide components may comprise at least one additional guide chain. The guide chain may be attached to the side of the drive chain. The links of the guide chain may be regarded as guide components.

The guide components may be designed in particular for rolling on the guide element, e.g., by rotatable rollers/bushes or roller bearings attached to the side of the drive chain. In particular, the guide components may roll on the guide element independently of the drive chain.

Guidance may be provided by any suitable components or elements, including rolling bearings, plain bearings, sleeve bearings, guide chains, bolts, etc., and/or the like.

The guide components may be arranged or extend to the side of the drive chain. As used herein, the word "lateral" is defined relative to the direction of movement of the drive chain. The plane formed by the direction of movement and the meshing direction of the counter-toothing may be described as the "movement plane" of the chain. The guiding components are arranged on one or both sides of the movement plane. To facilitate meshing, the pins of the drive chain may penetrate relatively deeply into the counter-toothing, allowing the tooth tip to extend beyond the roller chain. This may be ensured by the lateral offset of the guide (comprising guide components and guide elements).

The guide components may be arranged especially at the side of the pins and/or rollers of the drive chain, e.g. immediately beside the pins/rollers of the guide chain. In some examples, this may be provided by simply extending the pins of the drive chain to the guide components.

In some embodiments, the guide components may be arranged on both sides of the chain.

The counter-toothing may, for example, comprise a gear rack.

In some examples, the drive system comprises a motor which drives at least one of the pinions, in particular two drive pinions. In another embodiment, two or more motors (which are smaller and with lower power than in the case of a more powerful drive motor) may be provided for each drive pinion.

A compact drive module may be provided by enclosing the drive element in a housing. This housing reduces noise. Additionally or alternatively, noise generation may be reduced by using soft rollers. The drive chain which is known to be a conventional wear part can be easily replaced.

In the context of the present disclosure, however, not only the drive system is claimed, but also a part of the drive system, namely a roller chain, which comprises a device for forced guidance on a predetermined two-dimensional track curve. The roller chain thus has guide components and a guide element as described above and below, e.g., additional external rollers which may be arranged on extended pins of the chain. The rollers may be positively guided to reduce rolling friction (via rolling bearings) and thus generate, for example, a higher overlap. All features described in connection with the drive system may also be used in connection with the roller chain, where technically reasonable.

Examples, Components, and Alternatives

The following sections describe selected aspects of exemplary drive systems, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Drive System

As shown in FIGS. 1-6, this section describes an illustrative drive system 1. Drive system 1 is an example of the drive systems described above.

The embodiments described below refer to drive systems such as those used for rail-bound transport systems, especially for use in amusement vehicles.

Figure 2:
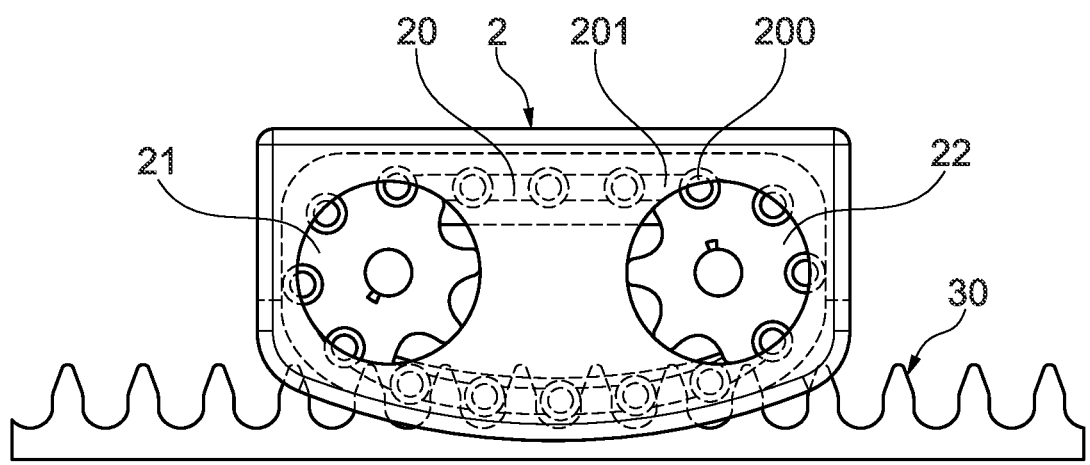
FIG. 2 shows another schematic illustration of the drive system according to the invention.

The drive system 1 shown in FIGS. 1 and 2 has a drive element 2 or drive unit on the one hand, and a counter-toothing 30 on the other, which in this embodiment is arranged on a guide rail 3. The counter-toothing 30 may include a gear rack or gear chain, for example.

The drive element 2 has two drive pinions 21 and 22, as well as a drive chain 20 driven by the drive pinions 21 and 22. The drive chain 20 may comprise a conventional roller chain with pins connected on both sides by plates 201 (outer and inner plates). Rollers 200 are arranged on the pins so that they can roll off the tooth flanks of the counter-toothing. The drive chain 20 is designed for mutual meshing with the counter-toothing 30 to provide a compact positive drive.

In addition, according to the invention the drive element 2 has guide components connected to the chain 20, and at least one guide element which cooperates/interacts with the guide components to hold or guide the chain in a predetermined section on a predetermined track or path. Variants of the guide components are described below.

The components of the drive element 2 can be accommodated compactly in a housing 4. One or two motors (not shown) which drive(s) the drive pinions 21 and/or 22 can be arranged outside the housing 4 and be coupled to the drive element 2 (namely the drive pinions 21, 22). In another embodiment the motor(s) can be integrated in housing 4.

The following figures show variants or concepts of the drive system 1 according to the invention. In FIGS. 3A, 3B, 4A, 4B, 5A, and 5B, portions of the drive element 2 and the counter-toothing 30 are illustrated. Identical or corresponding components are marked with the same reference signs. In particular, the drive element 2 has a drive chain 20. The meshing section (pitch circle) of the chain 20 is shown in each of the drawings, which is in mesh or almost in mesh with the counter-toothing 30.

Figure 3A:
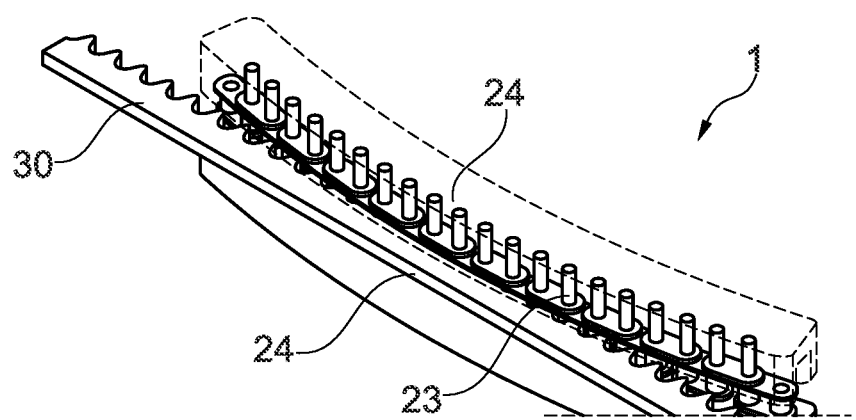
FIG. 3A is an illustration of a portion of a first embodiment of an illustrative drive system in accordance with aspects of the present disclosure.
Figure 3B:
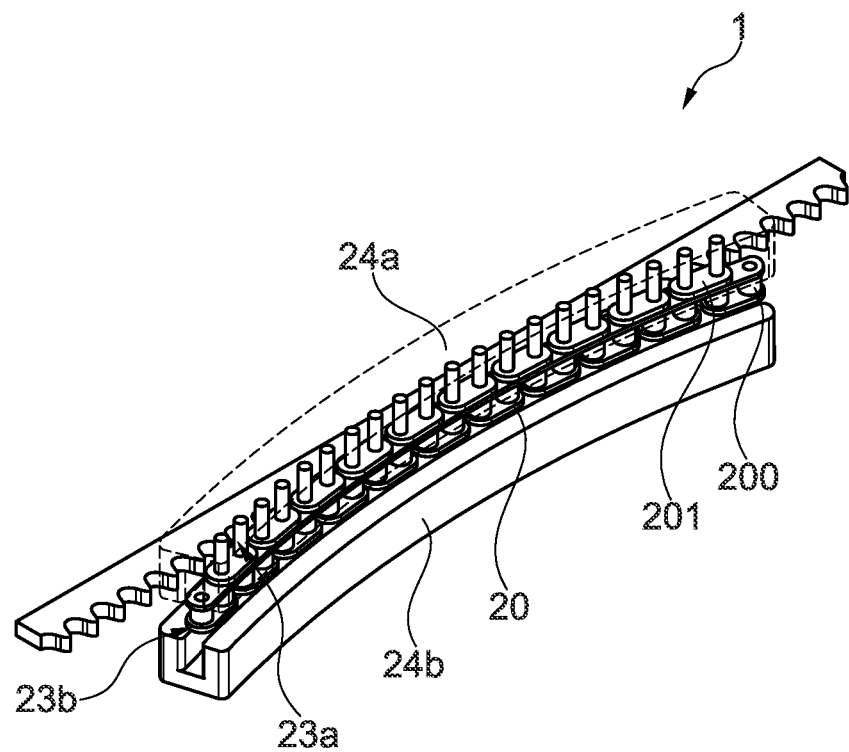
FIG. 3B is a second illustration of the portion of the first embodiment depicted in FIG. 3A.

FIGS. 3A and 3B show a first embodiment of drive system 2, from two different perspectives. In this example, each chain link has guide components 23 in the form of guide pins extending on both sides from the pins of the drive chain. The guide pins can be extensions/extended components of the pins of the drive chain 20 which protrude laterally (i.e., vertically in FIGS. 3A and 3B) from the drive chain 20.

The guide components 23 are guided by a guide element 24 (here comprising an upper guide element 24A and a lower guide element 24B) which has at least one groove in which the guide pins engage. The guide element 24 is arranged in an area of the drive element 2 in which the drive chain 20 is intended to engage in/mesh with the counter-toothing 30, as shown in FIGS. 3A, 3B.

Figure 4A:
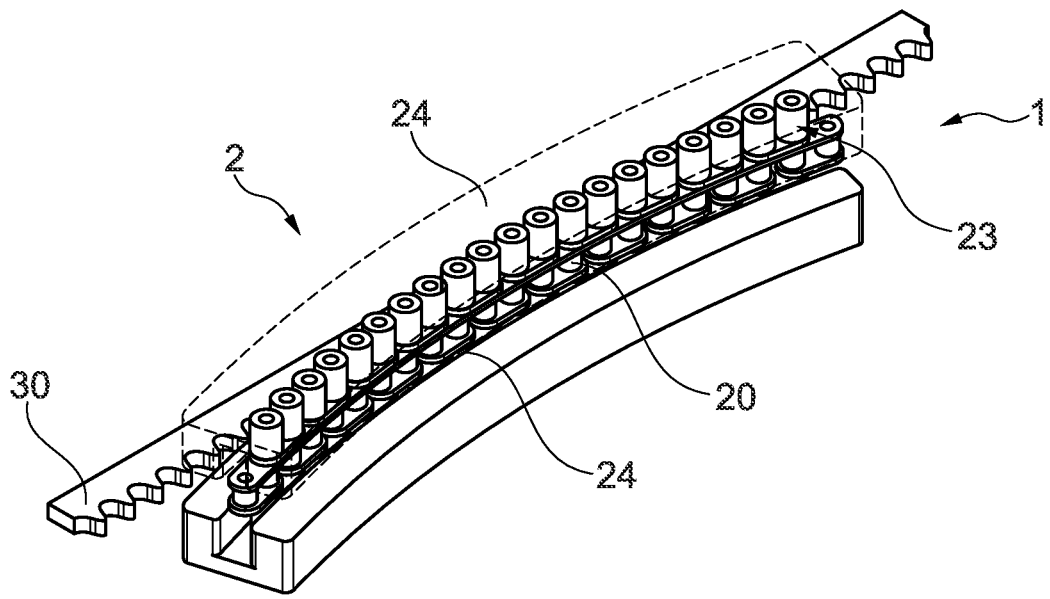
FIG. 4A is an illustration of a portion of a second embodiment of an illustrative drive system in accordance with aspects of the present disclosure.
Figure 4B:
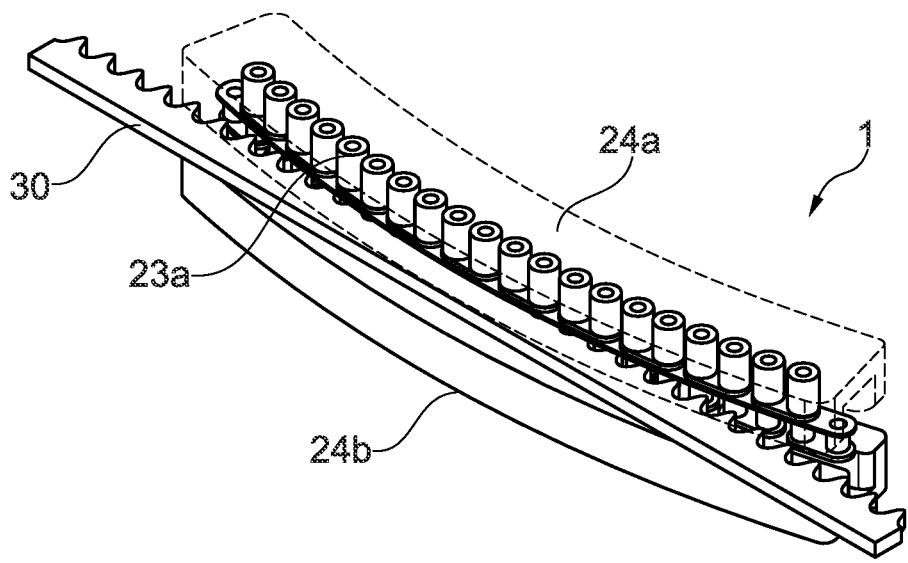
FIG. 4B is a second illustration of the portion of the second embodiment depicted in FIG. 4A.

FIGS. 4A and 4B show a second embodiment of drive system 2, from two different perspectives. In this example, each chain link has guide components 23 in the form of sliding bushes or rollers extending on both sides from the links of the drive chain 20. The sliding bushings can roll independently of the drive chain 20 on a guide element 24 (here comprising an upper guide element 24A and a lower guide element 24B). The guide element 24 may have a curved guide surface with a large radius, for example, with which the rollers of the drive element 2 are in contact in the engagement section of the drive element 2 and along which they roll in order to guide the drive chain 20 in this section. This reduces the friction generated by the guide (as rolling friction instead of sliding friction). This variant comprises a rolling bearing. The guide element 24 is arranged in at least one area of the drive element 2 in which the drive chain 20 is intended to engage in/mesh with the counter-toothing 30, as shown in FIGS. 4A, 4B.

Figure 5A:
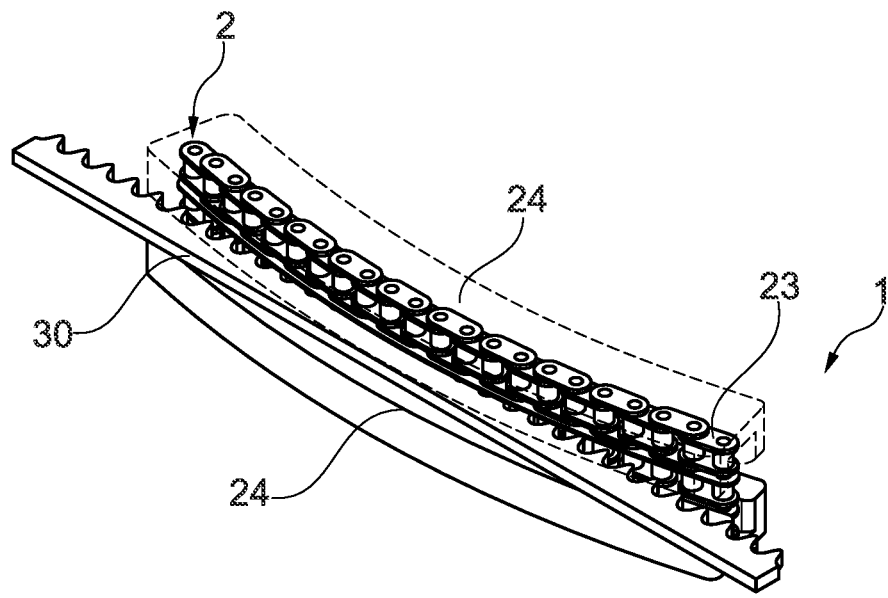
FIG. 5A is an illustration of a portion of a third embodiment of an illustrative drive system in accordance with aspects of the present disclosure.
Figure 5B:
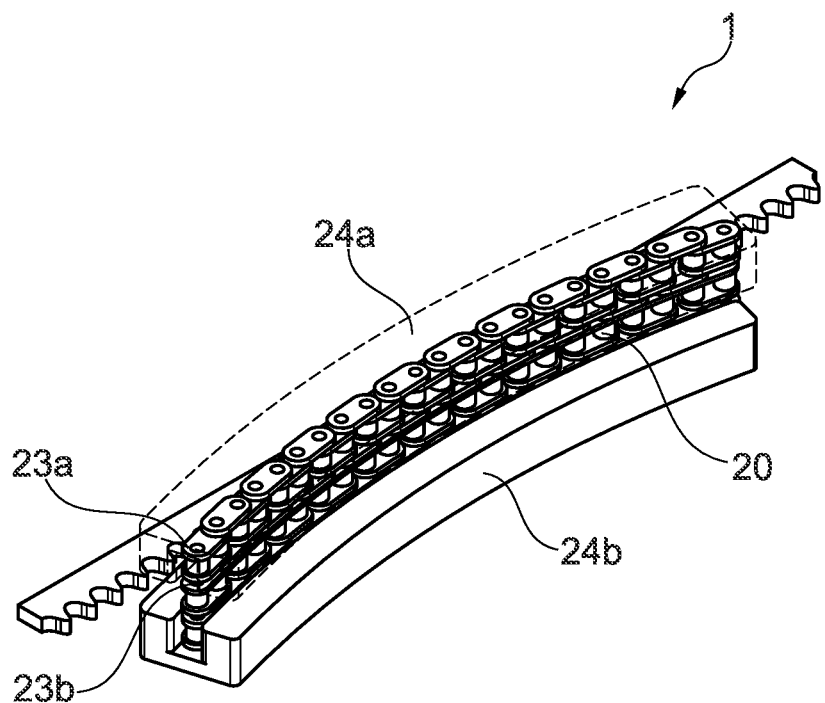
FIG. 5B is a second illustration of the portion of the third embodiment depicted in FIG. 5A.

FIGS. 5A and 5B show a third embodiment of drive system 2, from two different perspectives. In this example, the guide components 23 for the drive chain 30 are designed in the form of a guide chain (or its components) which is arranged laterally on the drive chain 30 and connected to it. In this case, two guide chains 23A and 23B are provided, one of which is attached to each side of the drive chain 30. The drive chain 20 and the guide chains 23 are connected to each other so that the guide chains 23 guide the drive chain 20.

The guide chains 23A and 23B interact with the guide element 24 to guide the drive chain 23. The guide element 24 may comprise a guide surface or a groove on/in which the guide chain slides. Preferably, however, the guide element 24 has a structure along which the rollers of the guide chain 23 can roll or unroll. For example, a profile can be provided on the guide element 24 on which the rollers of the guide chain(s) roll along, e.g., a burr arranged between the chain links of the guide chain. In another embodiment, the guide element 24 itself can be designed in the form of a plurality of gear wheels which guide the guide chain 23 and thus the drive chain 20 connected to it. In this variant, the chain links of the chains 20 and 23 roll off at the respective counter-toothing 30 or the teeth of the guide element 24 so that friction is reduced.

Due to guide components 23 arranged on the side of the drive chain 20, the guide construction does not interfere with the drive and vice versa. The teeth of the counter-toothing 30 can therefore engage deep between the chain links of the drive chain 20. This allows large forces to be transmitted. The guide construction can be designed to be relatively independent of the transmission of the driving force.

In the embodiments shown, both the drive chain 20 and, if applicable, the guide chain 23 are shown as roller chains. Of course, any type of chain can be used which is appropriate for the invention. In any case, it is possible to implement a pitch circle with a large radius and thus high power transmission between the drive element 2 and the counter-toothing 30. Nevertheless, the size of drive element 2 may be small.

Figure 6:
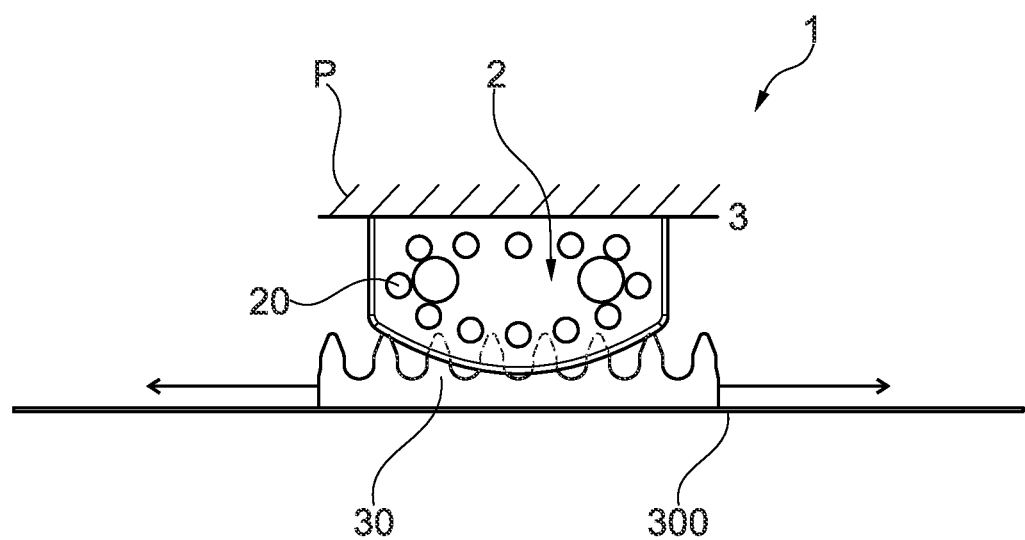
FIG. 6 depicts another embodiment of an illustrative drive system in accordance with aspects of the present disclosure.

FIG. 6 shows another embodiment. In this embodiment, the system 1 has a drive element 2, which is stationary at a position P, and a movable counter-toothing 30. The drive element 2 is designed to move or drive the counter-toothing 30 (e.g. a gear rack) linearly in a stationary guide component 300, similar to a spindle drive.

B. Illustrative Combinations and Additional Examples

This section describes additional aspects and features of drive systems of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A drive system comprising:
a drive element; and a counter-toothing, the drive member comprising:
an endless chain for mutual engagement with the counter-toothing for transmitting a driving force; and at least one drive pinion for mutual engagement with the chain and for driving the chain, wherein guide components are arranged at the chain; and the drive system has a guide element for guiding the guide components of the chain at least in the region of engagement with the counter-toothing, the guide element being arranged such that the guide components are guided by the guide element during the movement of the chain.

A1. The drive system according to A0, wherein the counter-toothing is arranged in a stationary manner at least along a section of a transport path, in particular fixed to a guide rail of the section of the transport path.

A2. The drive system according to A0, wherein the counter-toothing is movable and the drive element is arranged stationary.

A3. The drive system according to any one of paragraphs A0 through A2, wherein the guide element has at least one of a guide groove and a guide surface for engaging and/or abutting the guide components.

A4. The drive system according to any one of paragraphs A0 through A3, wherein the guide components comprise bolts.

A5. The drive system according to any one of paragraphs A0 through A3, wherein the guide components comprise rolling bearings and/or sliding bushings.

A6. The drive system according to any one of paragraphs A0 through A5, wherein the guide components comprise at least one guide chain.

A7. The drive system according to any one of paragraphs A0 through A6, wherein the guide components are designed for rolling on the guide element.

A8. The drive system according to any one of paragraphs A0 through A7, wherein the guide components are disposed laterally of the chain or extend laterally from the chain.

A9. The drive system according to any one of paragraphs A0 through A8, wherein the guide components are arranged laterally of the pins and/or rollers of the chain.

A10. The drive system according to any one of paragraphs A0 through A9, wherein the guide components are arranged on both sides of the chain.

A11. The drive system according to any one of paragraphs A0 through A10, wherein the counter-toothing is a rack.

A12. The drive system according to any one of paragraphs A0 through A11, wherein the drive system has a motor which drives at least one of the drive pinions, in particular two drive pinions.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A drive system comprising:
a drive element;
a counter-toothing;
the drive element comprising an endless chain mutually engaged with the counter-toothing such that a driving force is transmittable from the drive element to the counter-toothing, and at least one drive pinion mutually engaged with the endless chain and configured to drive the endless chain, wherein the endless chain has a plurality of drive pins and rollers configured to engage the counter-toothing;
a plurality of guide components coupled to the endless chain, wherein the guide components are arranged laterally with respect to the drive pins of the endless chain; and
a guide element configured to guide the guide components of the endless chain at least in a region of mutual engagement with the counter-toothing, the guide element being arranged such that the guide components are guided by the guide element during movement of the endless chain.

2. The drive system according to claim 1, wherein the counter-toothing is fixed to a guide rail of a section of a transport path.

3. The drive system according to claim 1, wherein the guide element has a guide groove configured to engage the guide components.

4. The drive system according to claim 1, wherein the guide element has a guide surface configured to engage the guide components.

5. The drive system according to claim 1, wherein the guide components comprise bolts.

6. The drive system according to claim 1, wherein the guide components comprise rolling bearings.

7. The drive system according to claim 1, wherein the guide components comprise sliding bushings.

8. The drive system according to claim 1, wherein the guide components comprise at least one guide chain.

9. The drive system according to claim 1, wherein the guide components are configured to roll on the guide element.

10. The drive system according to claim 1, wherein the guide components are disposed laterally of the endless chain.

11. The drive system according to claim 1, wherein the guide components extend laterally from the endless chain.

12. The drive system according to claim 1, wherein the guide components are arranged laterally with respect to rollers of the endless chain.

13. The drive system according to claim 1, wherein the guide components are arranged on both sides of the endless chain.

14. The drive system according to claim 1, wherein the counter-toothing comprises a rack.

15. The drive system according to claim 1, wherein the drive system has a motor which drives at least one of the drive pinions.

16. The drive system according to claim 1, wherein the driving force is transmitted from the drive element to the counter-toothing, such that the drive element is driven along a transport path relative to a stationary counter-toothing.

17. The drive system according to claim 1, wherein the counter-toothing is stationary at least along a section of a transport path.

* * * * *